Oct. 3, 1950        P. SCHENK        2,524,234
VALVE
Filed March 13, 1948
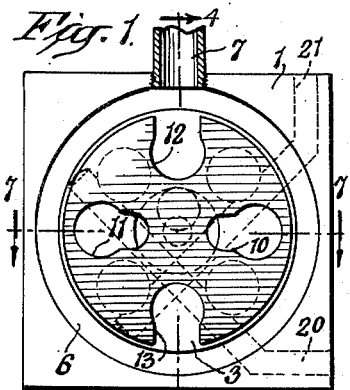
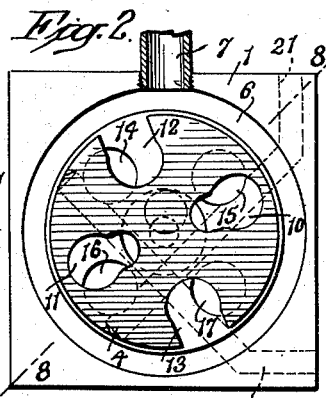
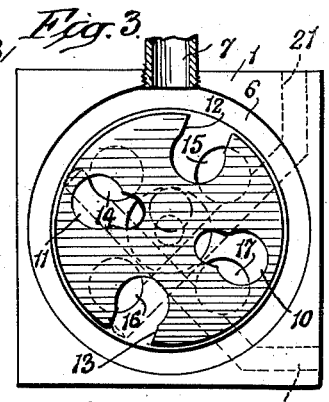
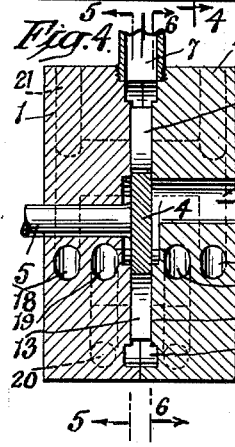
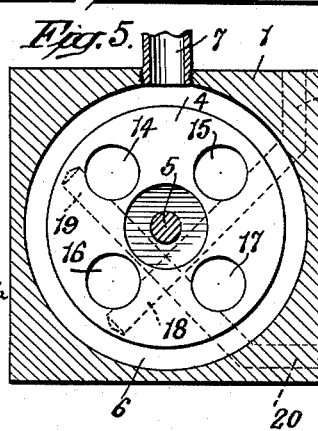
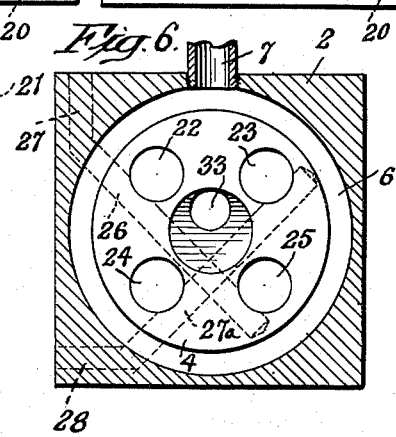
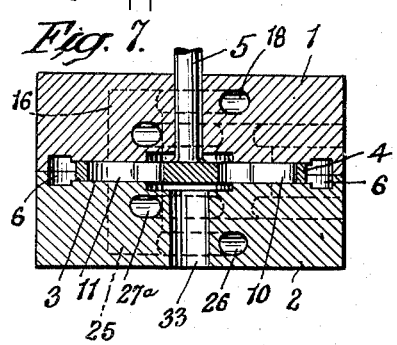
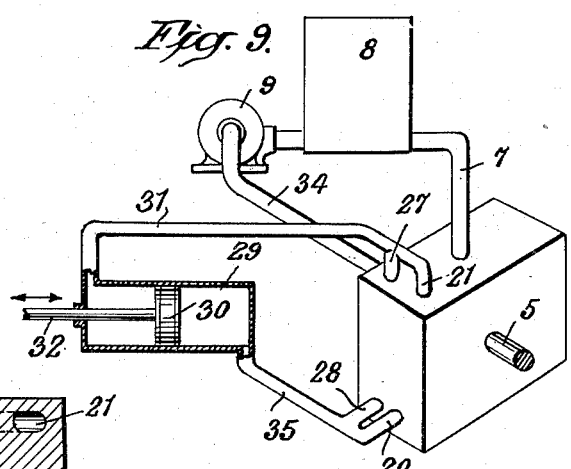
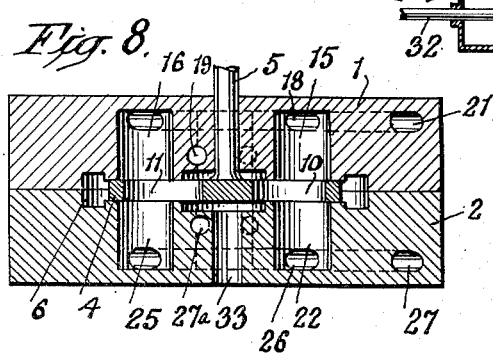
INVENTOR.
Pieter Schenk
BY Harry Radzinsky
ATTORNEY Patented Oct. 3, 1950

2,524,234

UNITED STATES PATENT OFFICE 2,524,234

VALVE

Pieter Schenk, South Ozone Park, N. Y.

Application March 13, 1948, Serial No. 14,649

8 Claims. (Cl. 251—85)

This invention relates to valves, and particularly to those generally employed for controlling the flow of hydraulic fluid to and from a controlling element. Valves of this general character are often used to advantage in airplane controls and in various other environments.

Most valves of this type are of unbalanced construction. That is to say, the pressure of the fluid against the valve is greater in one portion of its area than in another, such an arrangement generally resulting in requiring an increase in operating power and in a reduction in the sensitivity of operation of the valve. Therefore, the primary object of the present invention is to provide a valve which will, due to its novel design, be perfectly balanced and the forces acting upon it due to the operating pressure of the controlled medium are balanced and therefore cancelled out.

Another object of the invention is to provide, in a valve of this character, means by which a two-directional flow of a fluid to control the operation of any device, can be positioned, controlled as to speed and actuated without torque regardless of the pressure of the fluid being handled.

Still another object of the invention is to provide a valve which will allow the most sensitive control of fluids under pressure, and which will, because of its balanced arrangement, be insensitive to the influences of any outside force, such as shock or acceleration.

These and other objects are attained by the invention, a more particular description of which will hereinafter appear and be set forth in the claims appended hereto.

In the accompanying drawing, wherein an illustrative embodiment of the invention is disclosed:

Fig. 1 is a face view of the valve, with one half of the valve casing removed, the valve being shown in its neutral position;

Fig. 2 is a similar view of the valve, showing the same moved to a position to establish communication with one set of ports;

Fig. 3 is a similar view of the valve showing the same moved into position to establish communication with the second set of ports;

Fig. 4 is a sectional view taken on the line 4—4 of Fig. 1, looking in the direction of the arrows;

Fig. 5 is a sectional view taken on the line 5—5 of Fig. 4, looking in the direction of the arrows;

Fig. 6 is a sectional view taken on the line 6—6 of Fig. 4, looking in the direction of the arrows;

Fig. 7 is a sectional view taken on the line 7—7 of Fig. 1, looking in the direction of the arrows;

Fig. 8 is a sectional view taken on the line 8—8 of Fig. 2, and

Fig. 9 is a diagrammatic view, illustrating one manner in which the valve may be coupled to a source of fluid under pressure and to the element which is actuated by said fluid and controlled by the improved valve.

Referring to the drawing, the housing or casing in which the valve is contained, is shown as being composed of the two suitably-united sections 1 and 2 so shaped that when the same are placed together, they define a valve chamber or seat 3 in which the valve 4 is rotatively mounted. The valve 4, in the form illustrated, consists of a circular plate or disk from which projects a centrally located stem or shaft 5, the latter projecting through an opening in the housing part 1 and being coupled to any suitable mechanical or manual means or device by which it may be rotated at the required time and to the extent necessary to position the valve as required.

The chamber 3 in which the valve 4 is located is of larger diameter than the valve 4 so that there is provided around the periphery of the valve, an annular space defining a chamber 6 in which the fluid under pressure is contained to thus completely surround the entire edge of the valve and exert a uniform pressure about the same. An inlet tube or pipe 7 has one of its ends in communication with the annular fluid chamber 6, and as shown in Fig. 9, said pipe 7 also communicating with a source of fluid under pressure, such as the tank 8 in which the fluid is maintained under the required pressure by means of the compressor shown at 9.

In the form illustrated, the valve 4 is provided with four openings extending through it, this number being illustrative, since the number of openings used may be materially increased if required. Two of the openings shown, and respectively designated at 10 and 11, are of elongated or "keyhole" formation, while the remaining two indicated at 12 and 13, are in the form of notches, opening inwardly from the periphery of the valve and being thus in constant communication with the annular chamber 6 so that the fluid contained therein can enter into these notches.

The half of the valve housing indicated at 1 is provided with four ports, indicated respectively at 14, 15, 16 and 17. The two ports indicated at 14 and 17 are connected together by a cross passage 19 from which extends an outlet 20. The two ports shown at 15 and 16 are connected together by the cross passage 18 from which extends the outlet 21.

The second half of the valve housing indicated at 2 is provided with four ports corresponding to those provided in the housing part 1, and indicated respectively at 22, 23, 24 and 25. Ports 22 and 25 are connected by a cross passage 26, the outlet of which is indicated at 27. In similar manner, the two ports 23 and 24 are connected together by the cross passage 27a which has its outlet indicated at 28. As will be noted in Fig. 9, the outlets 20 and 28 are connected together by pipe 35 which communicates with one end of a cylinder 29 in which a piston 30 is movable, the opposite end of the cylinder at the opposite side of the piston being in communication with connected pipes 21 and 27 by means of the pipe 31. Attached to the piston 30 is a rod 32 which is connected to any element or device intended to be actuated by reciprocating movements of the piston under pressure of the fluid delivered into the cylinder 29.

Provided in the housing portion 2 is an off-center outlet opening 33 through which the fluid is exhausted in a manner to be described, said outlet being connected by the pipe 34 which returns the fluid to the compressor 9 for recompression and delivery into the tank 8.

By reference to Figs. 1 to 3 of the drawing, the operation of the valve will be readily understood. The neutral position of the valve is shown in Fig. 1, wherein it will be noted that the four openings 10 to 13 inclusive, extending through the valve 4, are situated at positions between the ports 14 to 17 inclusive and 22 to 25 inclusive in the valve housing so that said ports are all closed by the valve at this time. The annular chamber 6 is filled with fluid under pressure which flows into the notch openings 12 and 13 of the valve. As the operating shaft or stem 5 is moved manually or by mechanical or electrical means to rotate the valve, and the same is shown in Fig. 2 as having been moved counter-clockwise from Fig. 1, the notches 12 and 13 will move into partial or complete registry with the ports 14 and 17, allowing the fluid under pressure to flow into said ports 14 and 17 and out of the outlet pipe 20. At the same time, it will be noted that the notch openings 12 and 13 also establish communication with the two ports 23 and 24 in the part 2 of the housing, allowing the flow of the fluid through these ports 23 and 24 and out of the outlet pipe 28. It will thus be noted that the fluid under pressure is now disposed equally on opposite sides of the valve 4 as well as about the edge thereof, so that a balanced arrangement is present. The fluid thus forced through outlets 20 and 28 will enter the cylinder 29 forcing the piston 30 to the left as viewed in Fig. 9. The fluid in the cylinder at the left side of the piston will be then displaced through pipe 31, through branches 27 and 21 thereof, and through the ports 22, 25, 15 and 16. At this time, the openings 10 and 11 in the valve are in communication with the several ports 22, 25, 15 and 16 and the openings 10 and 11 are also in communication with the outlet opening 33. Thus, the fluid moved as above described will be forced out through the opening 33 to reach the compression means 9 and be restored thereby to the tank 8.

When it is desired to cause movement of the piston 30 in a reverse direction, or toward the right, as viewed in Fig. 9, the valve 4 is moved clockwisely, or to the position shown in Fig. 3. It will be therein noted that the notch openings 12 and 13 are communicating with the ports 15, 16, 22 and 25, and that the outlets from these ports, consisting of the pipes 21 and 27, convey the fluid under pressure into cylinder 29 at the left side of the piston, thus shifting piston 30 to the right and displacing the fluid at the right of it, causing the latter fluid to be shifted through pipes 20 and 28 and through the ports 14, 17, 23 and 24 which are then in communication with the openings 10 and 11, and through which the fluid flows to reach the outlet 33 and the compressor 9.

The arrangement described is such that the fluid under pressure is, during the flow of the same, not only disposed on both sides of the valve 4 but is equally distributed about the edge or periphery of the same as well. The result of this structure is that a perfectly balanced arrangement is present in which rotative or operative movements of the valve are not impeded, torque is eliminated and the valve is extremely sensitive and is subject to accurate and precise control. Moreover, the mounting of the valve is such that the equalization of pressure on all sides of the valve renders it insensitive to influences of any outside force, such as shocks or acceleration, permitting the valve to be thus employed in environments wherein valves of the unbalanced type have been found deficient.

While I have shown one embodiment of the invention, it will be apparent to those skilled in this art that various changes may be made without departing from the spirit of the invention. The embodiment disclosed is in its simplest form for illustrative purposes; the number of openings through the valve, the ports cooperating therewith, the shape of the valve, its seat and housing and other elements of the structure are subject to variation, all without departing from the basic structure involved in which the disposition of the fluid under pressure on both sides of the valve head and about the edge as well is the essence of the invention and is comprehended in the claims appended hereto.

What I claim is:

1. A valve of the character described comprising, a disk-shaped rotatable valve head having a plurality of openings extending through it, some of said openings extending inwardly from the periphery of the head, a housing in which the valve head is contained and in which it is rotative, said housing including a chamber presenting an annular portion around the edge of the valve head and spaced therefrom to provide a passage for fluid under pressure around the edge of the valve head, the openings which enter from the edge of the valve head being in communication with the annular passage, the housing having a plurality of ports located on opposite side faces of the valve head, whereby fluid under pressure will be delivered into said ports from the annular passage when those openings through the valve head which communicate with said annular passage become registered with certain of the openings on the opposite sides of the valve head.

2. A valve of the character described comprising, a disk, a housing having a chamber in which the disk is rotative, said chamber being larger in diameter than the disk to thereby provide an annular fluid space around the edge of the disk, said disk having a group of openings passing through it and in constant communication with said annular fluid space, the disk having a second group of openings extending through it, the latter group of openings not communicating with said annular fluid space, the housing having groups of ports extending through it on opposite sides of the disk, the ports in the housing on one side of the disk being axially aligned with those on the opposite side thereof so that when one of the groups of openings through the disk is registered with ports at one side of the disk said openings will simultaneously register with a similar group on the opposite side of the disk.

3. A valve of the character described comprising, a housing, a disk mounted for rotative movement therein, a chamber in which the disk is rotative, said chamber having an annular portion extending around the edge of the disk and providing a fluid passage, the disk having a plurality of notched apertures leading inwardly from said annular fluid passage, the housing having ports on opposite sides of the disk with which said notched openings are brought into registration by rotative movements of the disk, the disk having a second series of apertures being not in communication with the annular fluid passage, the second series of apertures being adapted to be placed in communication with certain of the ports on opposite sides of the disk when the notched apertures are brought into registry with other of said ports, the housing being provided with an outlet opening with which the second series of apertures through the disk is in communication.

4. A valve of the character described comprising, a housing, a disk mounted for rotative movement therein, a chamber in which the disk is rotative, said chamber having an annular portion extending around the edge of the disk and providing a fluid passage in which fluid under pressure is forced into contact with the edge of the disk, the disk having a plurality of notched apertures leading inwardly from said annular fluid passage, the housing having ports on opposite sides of the disk with which said notched openings are brought into registration by rotative movements of the disk, the disk having a second series of apertures extending through it, said second series of apertures being not in communication with the annular fluid passage, the second series of apertures being adapted to be placed in communication with certain of the ports on opposite sides of the disk when the notched apertures are brought into registry with other of said ports, the housing being also provided with an outlet opening with which the second series of apertures through the disk is in constant communication, and an inlet from a source of fluid under pressure communicating with the annular fluid passage.

5. In a valve of the character described, a housing having a valve chamber, a rotary valve head contained therein, the chamber being larger than the valve head to thereby provide an annular fluid passage about the valve head in which fluid under pressure is maintained about the edge of the valve head, a source of fluid under pressure in communication with the annular passage, the housing having ports on opposite sides of the valve head, the housing having an outlet opening at one side of the valve head, the valve head having a first group of openings extending through it in constant communication with the outlet opening, said group of openings being brought by rotative movements of the valve head into communication with selected ports on opposite sides of the valve head while said openings are also in communication with the outlet opening, the valve head also having a second group of openings which are in constant communication with the annular fluid passage, the latter openings being adapted to be brought into registration with selected ports on opposite sides of the valve head simultaneously with the bringing of the first group of openings into registration with other of the ports in the housing.

6. In a valve of the character described, a housing having a chamber in which a valve head is mounted, the valve head being in the form of a disk, the disk being of less diameter than the chamber to provide an annular fluid passage between the edge of the disk and the inner wall surface of the chamber, means for conveying a fluid under pressure into said passage, the disk having openings through it, some of said openings being in communication with said passage, the housing having ports on opposite sides of the disk with which the openings through the valve are adapted to be brought into communication upon rotative movement of the disk, some of the ports on one side of the disk being in communication with some of the ports on the opposite side of the disk, while other of the ports on one side of the disk are in communication with other of the ports on the other side of the disk, one of the ports through the housing being an outlet opening, and some of the openings through the disk being in constant communication with said outlet opening.

7. In a valve of the character described, a housing having a chamber in which a disk-shaped valve head is mounted, the head being of less diameter than the chamber to thereby provide an annular fluid passage between the edge of the head and the inner wall surface of the chamber, means for conveying a fluid under pressure into said passage, the head having a plurality of openings through it, some of said openings leading to the edge of the head and being in communication with said passage, the housing having groups of ports on opposite sides of the head with which the openings through the head are adapted to communicate upon rotative movement of the head, the ports in one group on one side of the head being in communication with the ports in another group on the opposite side of the head, while the ports in a second group on one side of the head are in communication with the ports in a second group on the other side of the head, one of the ports in the housing constituting an outlet opening, and the openings through the valve head which are not in communication with the annular passage being in constant communication with said outlet opening.

8. In a valve of the character described, a housing having a valve chamber, a rotary valve head therein, the chamber providing an annular fluid passage around the periphery of the valve head, the valve head having two groups of apertures extending through it, one group of said apertures being in communication with the annular fluid passage, the housing having an outlet opening with which the second group of apertures is in communication, the housing having two groups of ports on each side of the valve head whereby rotative movement of the valve will register one of its groups of apertures with a group of ports on each side of the valve head simultaneously with the registration of the second group of apertures with the second group of ports on each side of the valve head.

PIETER SCHENK.

REFERENCES CITED

The following references are of record in the file of this patent:

UNITED STATES PATENTS

| Number | Name | Date |
| --- | --- | --- |
| 978,463 | Loedige | Dec. 13, 1910 |
| 1,169,666 | Mayer | Jan. 25, 1916 |